(12) United States Patent
Giffin et al.

(10) Patent No.: US 8,708,643 B2
(45) Date of Patent: Apr. 29, 2014

(54) COUNTER-ROTATABLE FAN GAS TURBINE ENGINE WITH AXIAL FLOW POSITIVE DISPLACEMENT WORM GAS GENERATOR

(75) Inventors: Rollin George Giffin, Cincinnati, OH (US); Kurt David Murrow, West Chester, OH (US); Oladapo Fakunle, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 1860 days.

(21) Appl. No.: 11/838,379

(22) Filed: Aug. 14, 2007

(65) Prior Publication Data
US 2013/0081374 A1   Apr. 4, 2013

(51) Int. Cl.
*F01C 1/107* (2006.01)
(52) U.S. Cl.
USPC .......................................... 415/62; 416/177
(58) Field of Classification Search
USPC .............. 60/39.43, 39.162, 45, 226.1, 268, 60/39.45; 415/62, 65, 62.65; 416/124, 416/128, 175, 177, 198 R
See application file for complete search history.

(56) References Cited

U.S. PATENT DOCUMENTS

| | | |
|---|---|---|
| 1,892,217 A | 12/1932 | Moineau |
| 2,553,548 A | 5/1951 | Canazzi et al. |
| 3,938,915 A | 2/1976 | Olofsson |
| 3,947,163 A | 3/1976 | Olofsson |
| 4,144,001 A | 3/1979 | Streicher |
| 4,179,250 A | 12/1979 | Patel |
| 4,482,305 A | 11/1984 | Natkai et al. |
| 4,500,259 A | 2/1985 | Schumacher |
| 4,790,133 A | 12/1988 | Stuart |
| 4,802,827 A | 2/1989 | Fujiwara et al. |
| 4,818,197 A | 4/1989 | Mueller |
| 4,842,484 A | 6/1989 | Johnson |
| 4,863,357 A | 9/1989 | Olofsson |

(Continued)

FOREIGN PATENT DOCUMENTS

| | | |
|---|---|---|
| EP | 302877 B1 | 12/1991 |
| EP | 627041 B1 | 9/1999 |

(Continued)

OTHER PUBLICATIONS

EP06255326, European Search Report, European Patent Office, Mar. 26, 2007.

(Continued)

*Primary Examiner* — Edward Landrum
*Assistant Examiner* — Liam McDowell
(74) *Attorney, Agent, or Firm* — General Electric Co.; Steven J. Rosen

(57) ABSTRACT

A counter-rotatable fan turbine engine includes a counter-rotatable fan section, a worm gas generator, and a low pressure turbine to power the counter-rotatable fan section. The low pressure turbine maybe counter-rotatable or have a single direction of rotation in which case it powers the counter-rotatable fan section through a gearbox. The gas generator has inner and outer bodies having offset inner and outer axes extending through first, second, and third sections of a core assembly. At least one of the bodies is rotatable about its axis. The inner and outer bodies have intermeshed inner and outer helical blades wound about the inner and outer axes and extending radially outwardly and inwardly respectively. The helical blades have first, second, and third twist slopes in the first, second, and third sections respectively. A combustor section extends through at least a portion of the second section.

60 Claims, 15 Drawing Sheets

(56) References Cited

U.S. PATENT DOCUMENTS

| | | | | |
|---|---|---|---|---|
| 4,999,994 | A | * | 3/1991 | Rüd et al. ............... 60/39.08 |
| 5,010,729 | A | | 4/1991 | Adamson et al. |
| 5,017,087 | A | | 5/1991 | Sneddon |
| 5,195,882 | A | | 3/1993 | Freeman |
| 5,279,109 | A | * | 1/1994 | Liu et al. ................ 60/785 |
| 5,692,372 | A | | 12/1997 | Whurr |
| 5,806,303 | A | * | 9/1998 | Johnson ................. 60/262 |
| 5,867,980 | A | * | 2/1999 | Bartos ................... 60/226.3 |
| 6,155,807 | A | | 12/2000 | Fenton |
| 6,339,927 | B1 | * | 1/2002 | DiPietro, Jr. ........... 60/226.1 |
| 6,651,433 | B1 | | 11/2003 | George, Jr. |
| 6,732,502 | B2 | * | 5/2004 | Seda et al. ............. 60/226.1 |
| 6,739,120 | B2 | * | 5/2004 | Moniz et al. ........... 60/226.1 |
| 6,763,653 | B2 | | 7/2004 | Orlando et al. |
| 6,763,654 | B2 | | 7/2004 | Orlando et al. |
| 6,905,319 | B2 | | 6/2005 | Guo |
| 7,314,035 | B2 | * | 1/2008 | Akmandor et al. ....... 123/236 |
| 7,707,815 | B2 | | 5/2010 | Murrow et al. |
| 7,877,980 | B2 | * | 2/2011 | Johnson ................. 60/226.1 |
| 2002/0026787 | A1 | * | 3/2002 | Bregentzer ............. 60/226.1 |
| 2004/0005235 | A1 | | 1/2004 | Didin |
| 2004/0060279 | A1 | | 4/2004 | Robert Joseph et al. |
| 2005/0089414 | A1 | | 4/2005 | Ohman |
| 2005/0226758 | A1 | | 10/2005 | Hossner |
| 2007/0084183 | A1 | * | 4/2007 | Moniz et al. ........... 60/204 |
| 2007/0137173 | A1 | * | 6/2007 | Murrow et al. ......... 60/226.1 |
| 2007/0137174 | A1 | | 6/2007 | Murrow et al. |
| 2007/0175202 | A1 | | 8/2007 | Murrow et al. |

FOREIGN PATENT DOCUMENTS

| | | |
|---|---|---|
| EP | 805743 B1 | 4/2000 |
| EP | 1132618 A2 | 9/2001 |
| EP | 1500819 A2 | 1/2005 |
| EP | 1624169 B1 | 8/2006 |
| EP | 1731734 A2 | 12/2006 |
| EP | 1798371 A1 | 6/2007 |
| FR | 787711 | 9/1935 |
| GB | 427475 | 4/1935 |
| GB | 2355768 A | 5/2001 |
| GB | 2400631 A | 10/2004 |
| JP | 2006-046322 A | 2/2006 |
| JP | 2006-342802 A | 12/2006 |
| JP | 2007-170374 A | 7/2007 |
| RU | 2232911 C1 | 7/2004 |
| SE | 89284 | 5/1937 |
| SE | 89284 C1 | 5/1937 |
| SU | 1567804 | 5/1990 |
| WO | WO9747886 | 12/1997 |
| WO | 2005/078240 A1 | 8/2005 |

OTHER PUBLICATIONS

EP Search Report issued in connection with corresponding European Application No. 08157708.2, Mar. 21, 2011.

RU Translation.

JP Notice of Allowance dated Jan. 15, 2013 from corresponding JP Application No. 2008-152354, along with English translation.

* cited by examiner

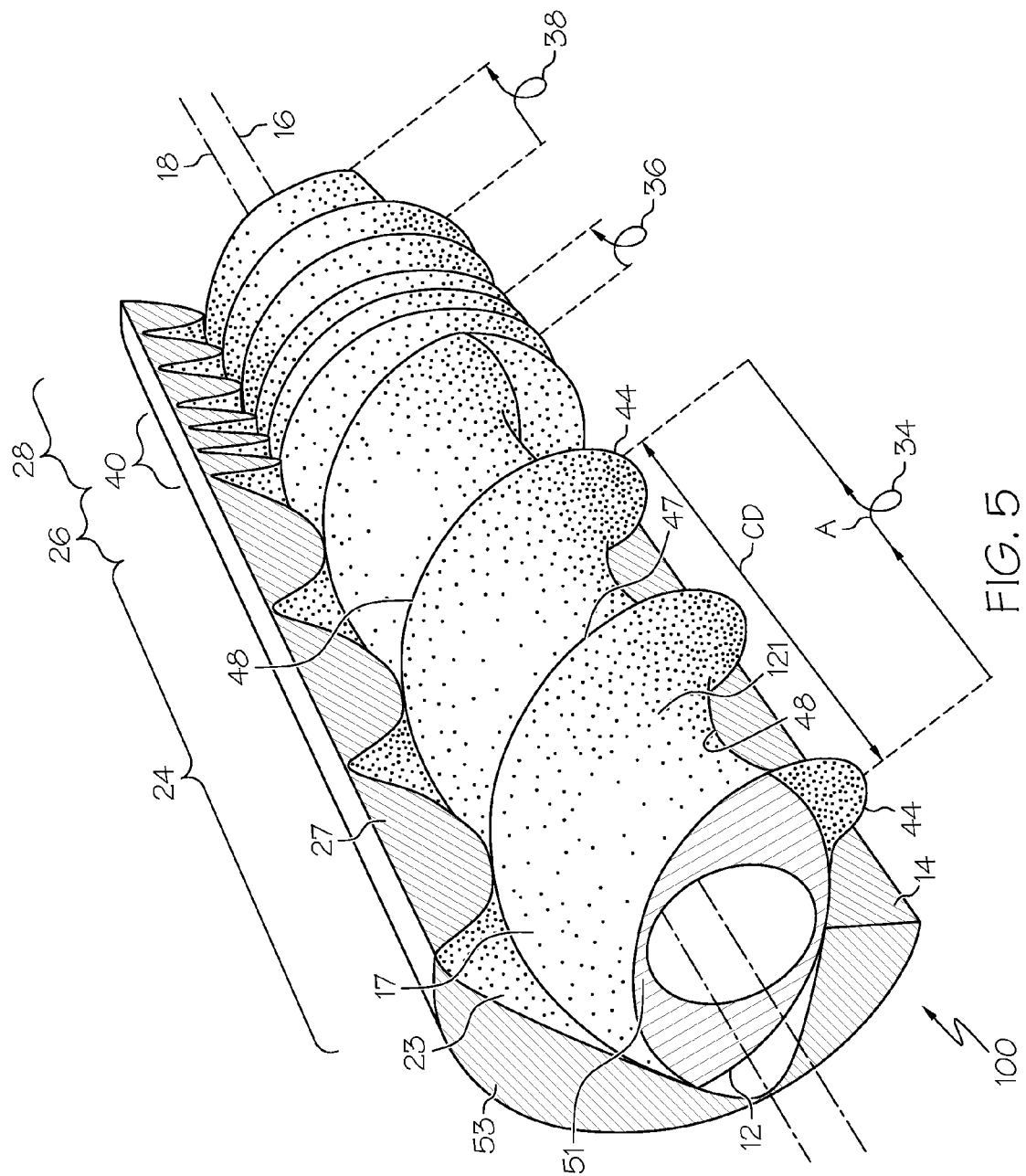

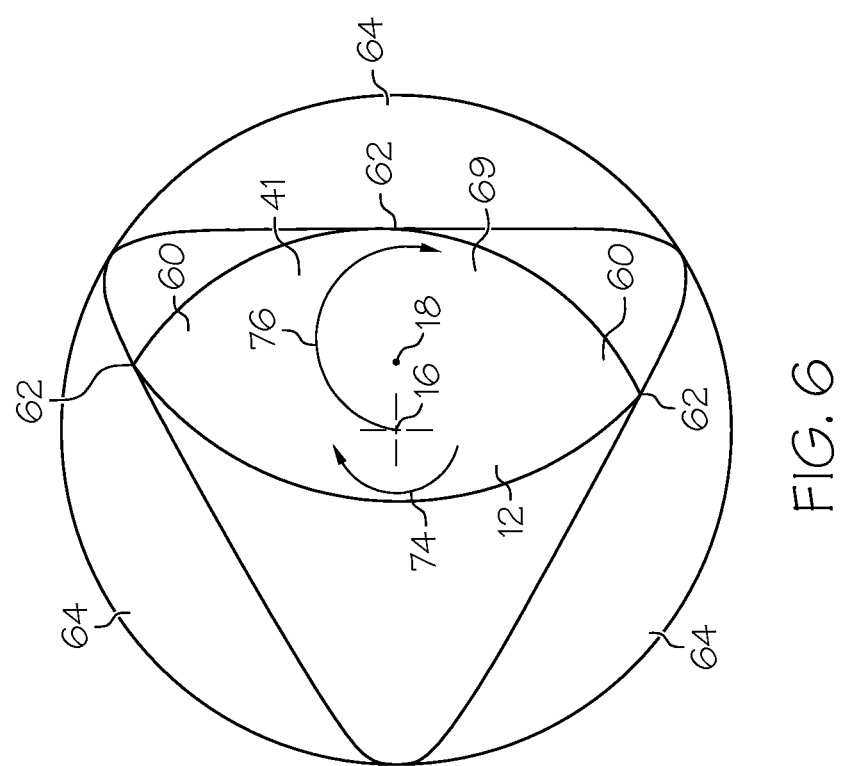

COUNTER-ROTATABLE FAN GAS TURBINE ENGINE WITH AXIAL FLOW POSITIVE DISPLACEMENT WORM GAS GENERATOR

The Government has rights to this invention pursuant to Contract No. NAS3-01135 awarded by the NASA.

BACKGROUND OF THE INVENTION

The present invention relates generally to gas turbine engines with counter-rotatable fans and, more particularly, to such engines having axial flow positive displacement gas generators and worm and screw compressors and turbines.

Aircraft gas turbine engines generally have in downstream flow relationship fan, compressor, combustion, and turbine sections. The turbine sections generally drive the compressor and fan sections. The combustor section burns fuel in an airflow compressed by the compressor to provide energy to the turbines. Aircraft gas turbine engines may have one, two, three, or more rotors or spools. One or two fans upstream of the compressor are driven by one or two turbines as are the compressors. The fans, compressors, and turbines typically include radially extending blades. Core engines or gas generators of the aircraft gas turbine engine generally include a high pressure compressor, a combustor, and a high pressure turbine to provide high energy fluid to the turbines to provide power for the engine's fan or fans. Continuous axial flow gas turbine engines are utilized in a wide range of applications owing in a great deal to a combination of desirable attributes such as high specific energy exhaust stream (energy per unit mass), high mass flow rate for a given frontal area, continuous near steady fluid flow, and reasonable efficiency over a wide range of operating conditions. It is desirable to have lightweight and highly efficient engines. One type of highly efficient engine includes counter-rotatable fans powered by counter-rotatable low pressure turbines such as those disclosed in U.S. Pat. Nos. 6,763,653, and 6,763,654.

Axial flow gas generators are particularly useful in many turbomachinery applications. Turbomachinery based gas generators are utilized in a wide range of applications owing in a great deal to a combination of desirable attributes such as high specific energy exhaust stream (energy per unit mass), high mass flow rate for a given frontal area, continuous, near steady fluid flow, reasonable thermal efficiency over a wide range of operating conditions. It is a goal of gas turbine engine manufacturers to have light-weight and highly efficient engines and gas generators. It is another goal to have as few parts as possible in the gas generator to reduce the costs of manufacturing, installing, refurbishing, overhauling, and replacing the gas generator. Therefore, it is desirable to have an aircraft gas turbine engine with a gas generator that improves all of these characteristics of gas turbine engines and their gas generators.

BRIEF DESCRIPTION OF THE INVENTION

A counter-rotatable fan gas turbine engine includes in downstream serial flow relationship, a counter-rotatable fan section, a positive displacement axial flow or worm gas generator, and a low pressure turbine operably connected to the counter-rotatable fan section. In one embodiment of the engine, the low pressure turbine is a counter-rotatable low pressure turbine. The positive displacement axial flow gas generator, includes an inlet axially spaced apart and upstream from an outlet. Inner and outer bodies having offset inner and outer axes, respectively, extend from the inlet to the outlet. Either or both bodies may be rotatable. In one embodiment of the generator, the inner body is rotatable about the inner axis within the outer body. The outer body may be rotatably fixed or rotatable about the outer axis. The inner and outer bodies have intermeshed inner and outer helical blades wound about inner and outer axes, respectively. The inner and outer helical blades extend radially outwardly and inwardly, respectively.

The helical blades have first, second, and third twist slopes in the first, second, and third sections, respectively. A twist slope is defined as the amount of rotation of a cross-section of the helical element per unit distance along an axis. The first twist slopes are less than the second twist slopes and the third twist slopes are less than the second twist slopes. A combustion section extends axially downstream from the end of the first section through at least a portion of the second section.

One exemplary embodiment of the counter-rotatable low pressure turbine includes upstream and downstream low pressure turbines drivingly connected to counter-rotatable upstream and downstream fan stages in the counter-rotatable fan section. A more particular embodiment of the counter-rotatable fan gas turbine engine includes the downstream low pressure turbine drivingly connected to the upstream fan stage by a low pressure inner shaft and the upstream low pressure turbine drivingly connected to the downstream fan stage by a low pressure outer shaft.

Another exemplary embodiment of the counter-rotatable low pressure turbine includes annular low pressure inner and outer drums drivingly connected to counter-rotatable upstream and downstream fan stages in the counter-rotatable fan section. The inner drum includes a plurality of axially spaced apart rows of circumferentially spaced apart and radially outwardly extending turbine blades. The outer drum includes a plurality of axially spaced apart rows of circumferentially spaced apart and radially inwardly extending turbine blades. The radially inwardly extending turbine blades are interdigitated with the radially outwardly extending turbine blades. A more particular embodiment of the counter-rotatable fan gas turbine engine includes the annular low pressure inner drum being drivingly connected to the downstream fan stage by a low pressure outer shaft and the outer drum being drivingly connected to the upstream fan stage by a low pressure inner shaft.

In another embodiment of the engine, the low pressure turbine is a single direction of rotation turbine drivingly connected to the counter-rotatable fan section by a single low pressure shaft through a drive gearbox such as a planetary gear box.

BRIEF DESCRIPTION OF THE DRAWINGS

FIG. 5 is a diagrammatic cut away perspective view illustration of the helical portions of inner and outer bodies of the gas generator illustrated in FIG. 3.

FIG. 6 is a diagrammatic cross-sectional view illustration of the inner and outer bodies taken through 6-6 in FIG. 4.

DETAILED DESCRIPTION OF THE INVENTION

Figure 1:
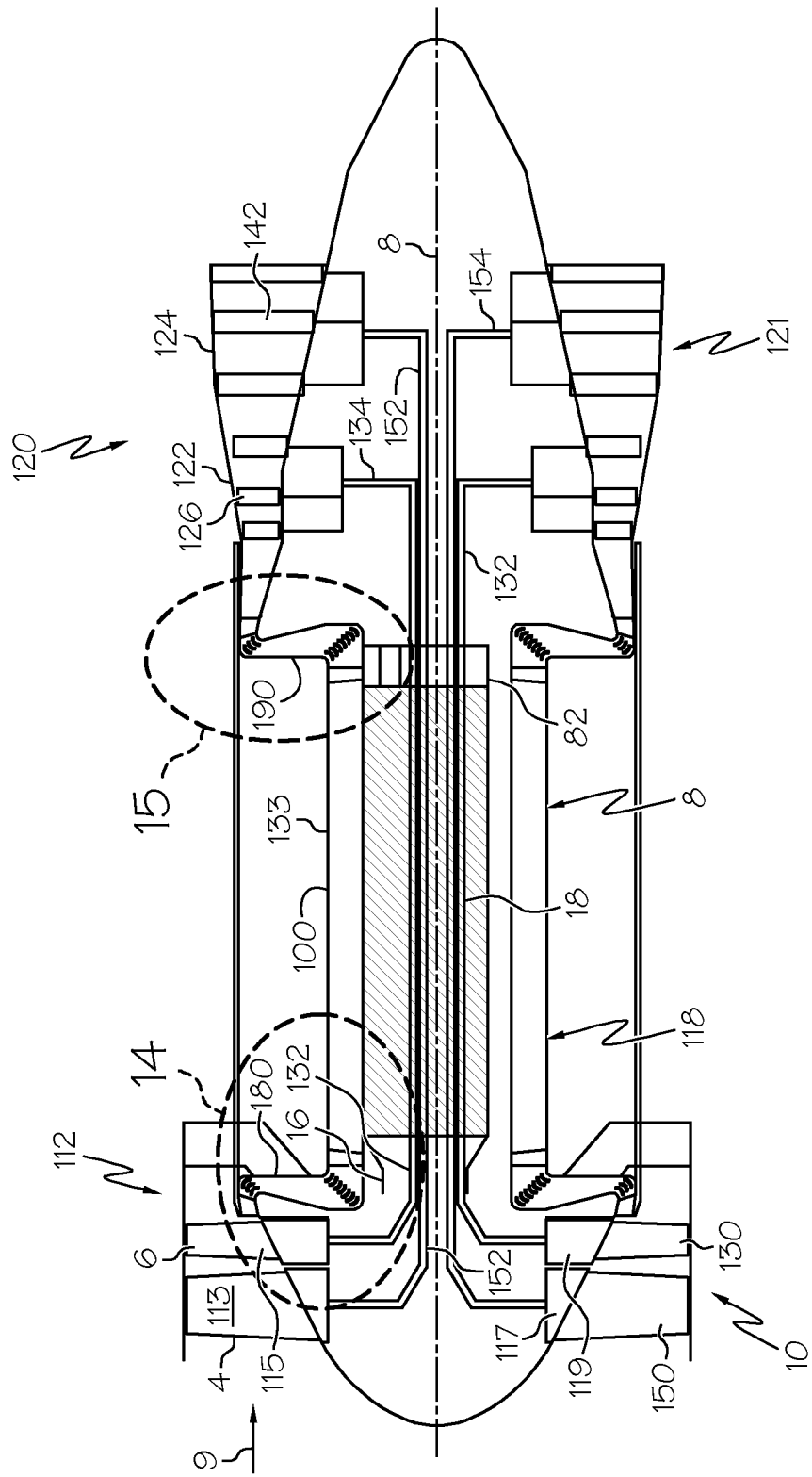
FIG. 1 is a cross-sectional view illustration of an exemplary aircraft gas turbine engine with a counter-rotatable fan section and a positive displacement axial flow or worm gas generator.
Figure 16:
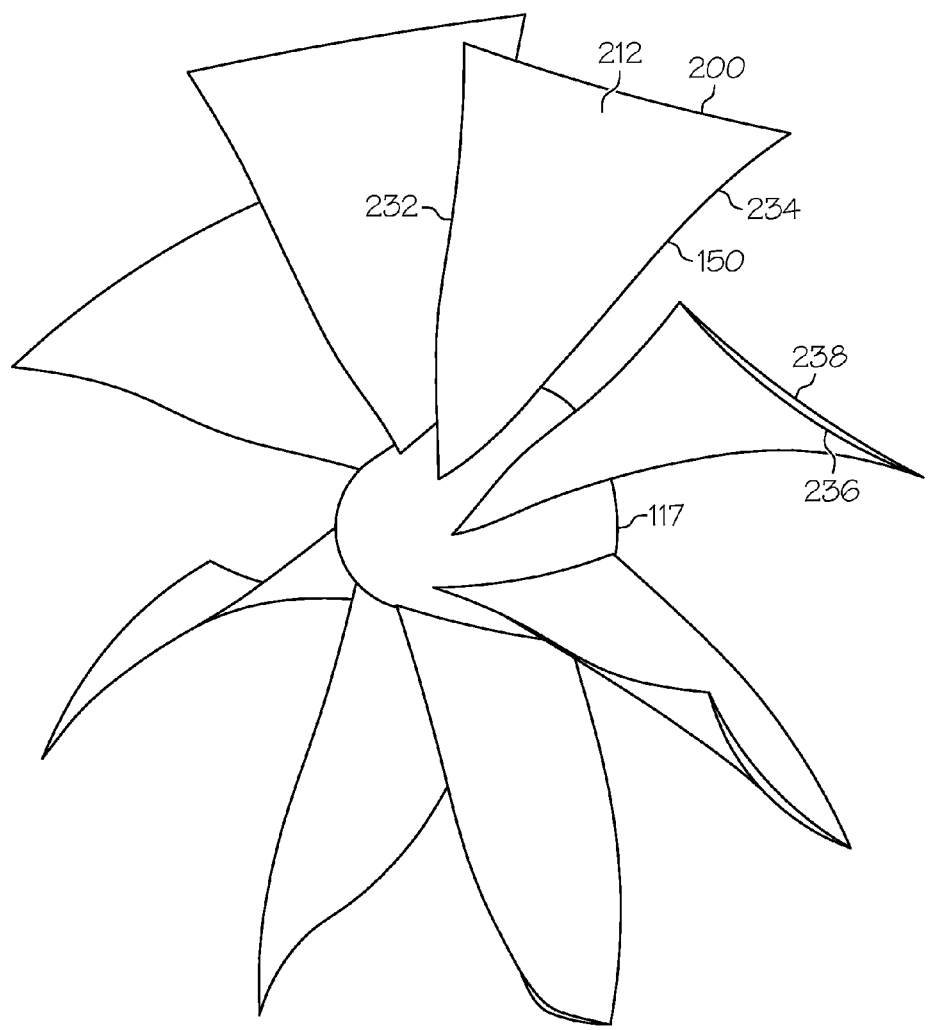
FIG. 16 is a perspective view illustration of an upstream fan stage of the counter-rotatable fans illustrated in FIG. 1.
Figure 18:
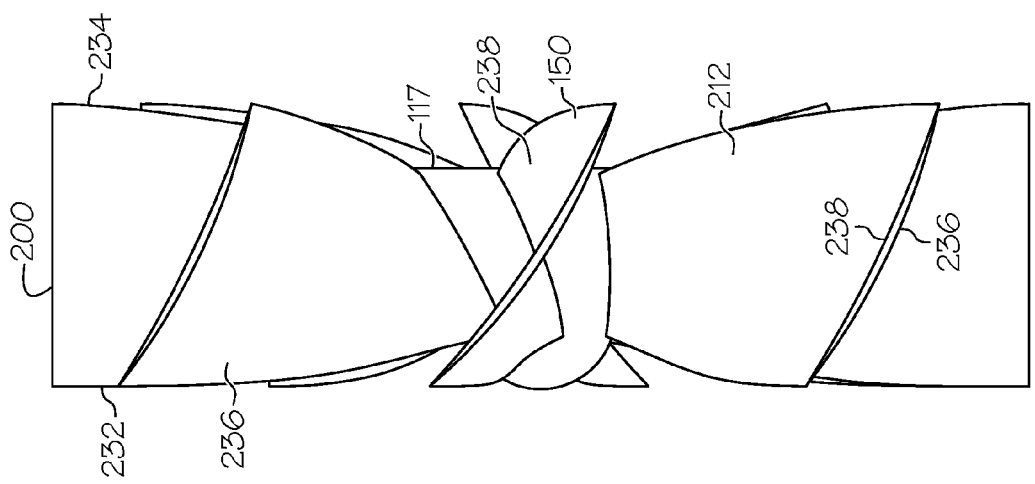
FIG. 18 is a side perspective view illustration of the upstream fan stage of the counter-rotatable fans illustrated in FIG. 16.
Figure 17:
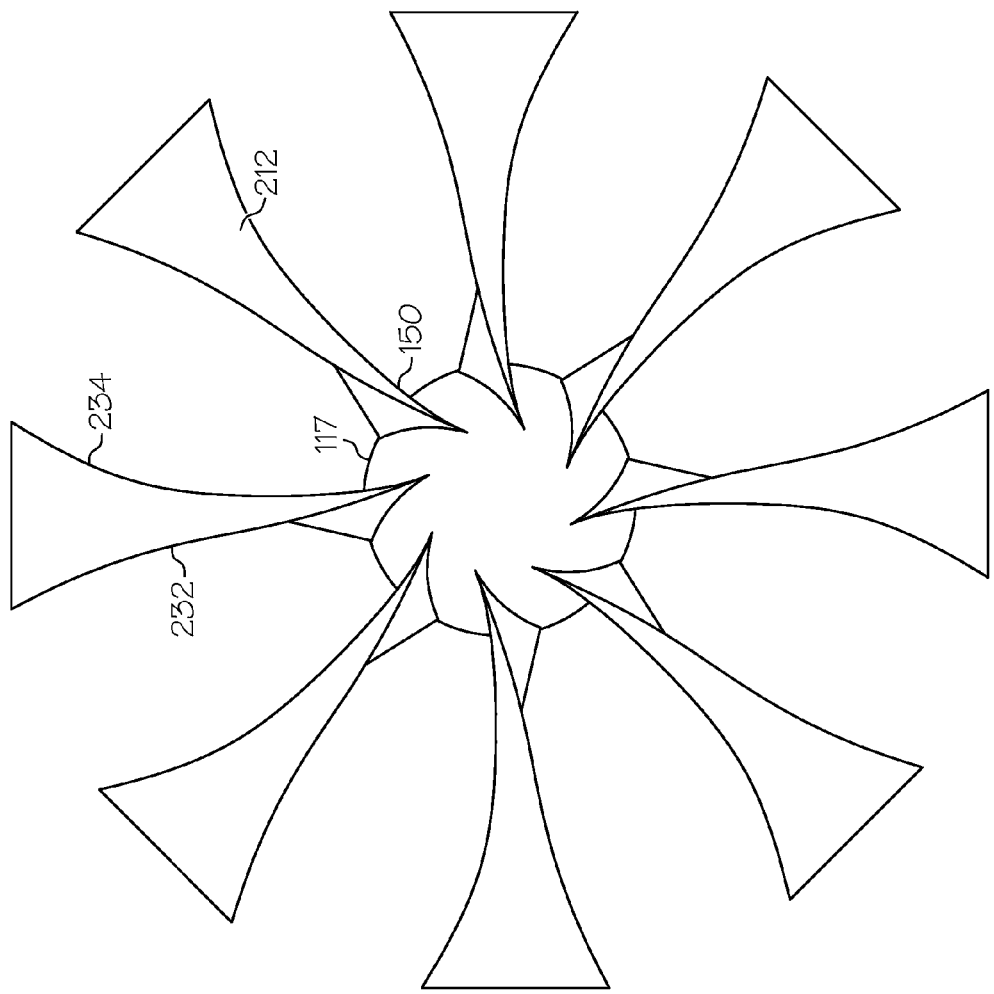
FIG. 17 is a forward looking aft perspective view illustration of the upstream fan stage of the counter-rotatable fans illustrated in FIG. 16.

Illustrated in FIG. 1 is an exemplary embodiment of an axial flow positive displacement or worm gas generator 100 in a counter-rotatable fan gas turbine engine 10 circumscribed about an engine centerline 8. A counter-rotatable fan section 112 of the engine 10 includes counter-rotatable upstream and downstream fan stages 4, 6 (further illustrated in FIGS. 16-18) and receives inlet airflow of ambient air 9. The upstream and downstream fan stages 4, 6 include upstream and downstream fan blade rows 113, 115, mounted on upstream and downstream fan disks 117, 119, respectively. Downstream of the fan section 112 is a core engine 118 which is the worm gas generator 100.

Figure 13:
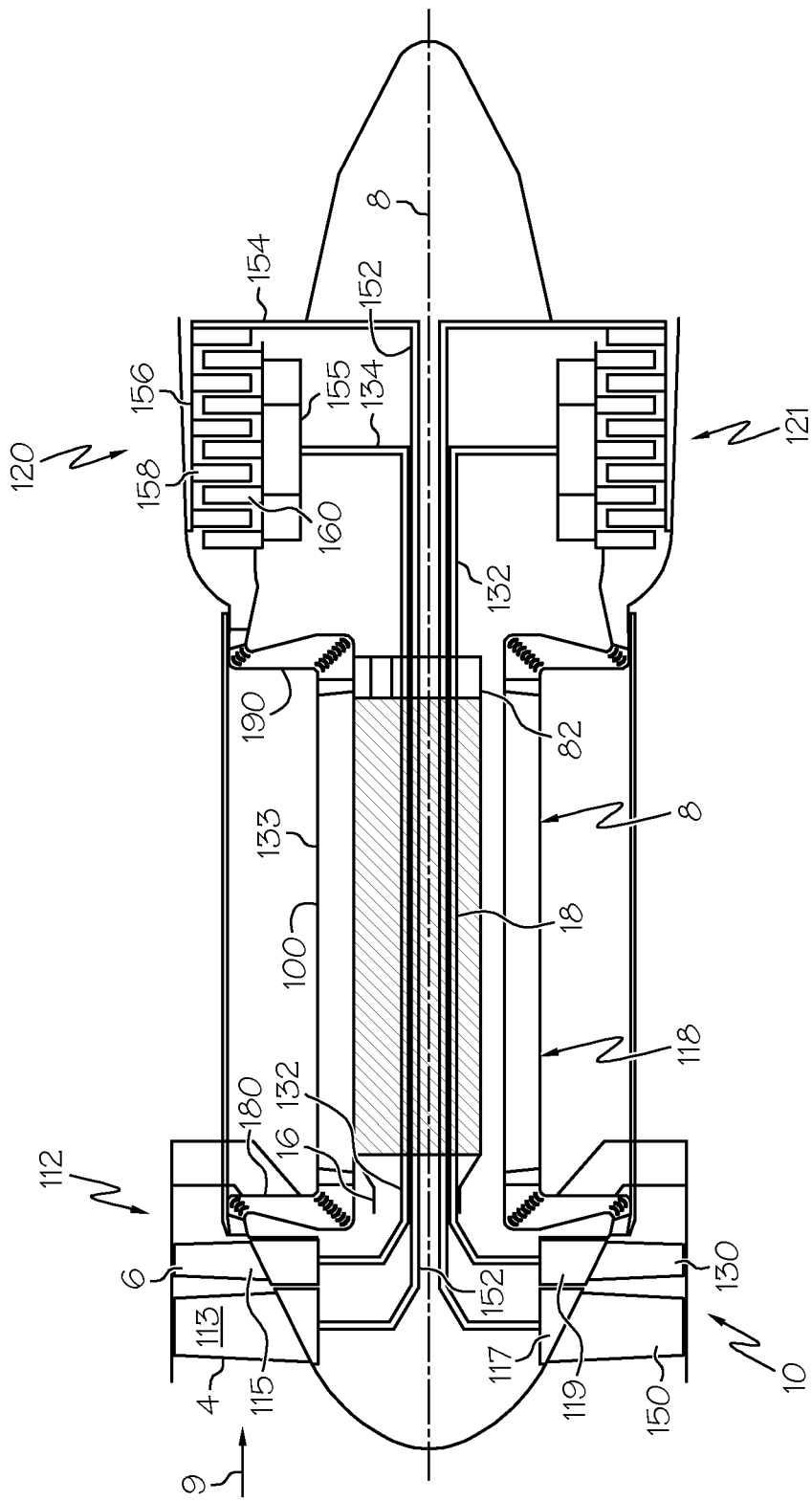
FIG. 13 is a cross-sectional view illustration of an alternative exemplary aircraft gas turbine engine with a counter-rotatable fan section and a positive displacement axial flow or worm gas generator and two interdigitated low pressure turbines.

The worm gas generator 100 discharges hot gases into a low pressure turbine (LPT) 120 which powers the counter-rotatable upstream and downstream fan stages 4, 6. The low pressure turbine (LPT) 120 illustrated in FIGS. 1 and 13 is a counter-rotatable low pressure turbine (LPT) 121. The worm gas generator 100 is substantially a high pressure spool 133. The counter-rotatable LPT 121 is powered by the hot gases discharged by the worm gas generator 100 into the counter-rotatable LPT 121. As illustrated in FIG. 1, the counter-rotatable LPT 121 has, in serial downstream flow relationship, upstream and downstream low pressure turbines 122, 124 respectively. The downstream low pressure turbine 124 is downstream of the upstream low pressure turbine 122. Combustion gases are discharged from the gas generator 100 into the upstream low pressure turbine 122 having a row of upstream low pressure turbine blades 126. The upstream low pressure turbine blades 126 are drivingly attached to downstream fan blades 130 of the downstream fan blade row 115 of the downstream fan stage 6 by a low pressure outer shaft 132 to form a low pressure outer spool 134 circumscribing the engine centerline 8.

Combustion gases are discharged from the upstream low pressure turbine 122 into the downstream low pressure turbine 124 having a row of downstream low pressure turbine blades 142. The downstream low pressure turbine blades 142 are drivingly attached to the upstream fan blade row 113 of upstream fan blades 150 of the upstream fan stage 4 by a low pressure inner shaft 152 to form a low pressure inner spool 154 circumscribing the engine centerline 8. Thus, the downstream low pressure turbine 124 is drivingly connected to the upstream fan stage 4 by the low pressure inner shaft 152 and the upstream low pressure turbine 122 is drivingly connected to the downstream fan stage 6 by a low pressure outer shaft 132.

An alternative embodiment of the counter-rotatable low pressure turbine (LPT) 121 is illustrated in FIG. 13. The counter-rotatable low pressure turbine 121 illustrated in FIG. 13 includes an annular outer drum 156 drivingly connected to the upstream fan stage 4 by a low pressure inner shaft 152. The outer drum 156 includes a plurality of axially spaced apart rows of circumferentially spaced apart and radially inwardly extending turbine blades 158. The counter-rotatable low pressure turbine 121 also includes an annular low pressure inner drum 155 drivingly connected to the downstream fan stage 6 by a low pressure outer shaft 132. The inner drum 155 includes a plurality of axially spaced apart rows of circumferentially spaced apart and radially outwardly extending turbine blades 160. The radially inwardly extending turbine blades 158 are interdigitated with the radially outwardly extending turbine blades 160.

The low pressure outer shaft 132 drivingly connects the inner drum 155 to the downstream fan blade row 115. The low pressure outer shaft 132, the inner drum 155, and the downstream fan blade row 115 are major components of the low pressure outer spool 134. The low pressure inner shaft 152 drivingly connects the outer drum 156 to the upstream fan blade row 113. The low pressure inner shaft 152, the outer drum 156, and the upstream fan blade row 113 are major components of the low pressure inner spool 154.

Referring to FIGS. 2-5, the gas generator 100 includes a core assembly 15 having inner and outer bodies 12 and 14 extending from an inlet 20 to an outlet 22. The inner body 12 is disposed within a cavity 19 of the outer body 14. The inner and outer bodies 12, 14 have inner and outer axes 16, 18 respectively. The core assembly 15 has first, second, and third sections 24, 26, 28 in serial downstream flow relationship. A combustion section 40 extends axially downstream through at least a portion of the second section. As illustrated herein, the combustion section 40 extends axially downstream from the end of the first section 24 through the entire second section 26. The core assembly 15 has continuous flow through the inlet 20 and the outlet 22.

Individual charges of air 50 are captured in and by the first section 24. Compression of the charges 50 occurs as the charges 50 pass from the first section 24 to the second section 26. Thus, an entire charge 50 undergoes compression while it is in both the first and second sections 24, 26, respectively. Combustion begins in the second section 26 after the entire charge 50 has passed out of the first section 24 into the second section 26. The third section 28 is an expansion section and, thus, extracts energy from the combusted charges of air 50 to power the first and second sections 24, 26, respectively. Expansion of the charges 50 occurs as the charges 50 pass from the second section 26 to the third section 28. Thus, the entire charge 50 undergoes expansion while it is in both the second and third sections 26, 28.

Either or both bodies may be rotatable and, if both bodies are rotatable, they rotate in the same circumferential direction clockwise or counter-clockwise at different rotational speeds determined by a fixed relationship. If only one body is rotatable, then the other body is fixed. In one embodiment of the generator, the inner body 12 is rotatable about the inner axis 16 within the outer body 14 and the outer body 14 may be rotatably fixed or rotatable about the outer axis 18.

The inner and outer bodies 12, 14 have intermeshed inner and outer helical elements wound about the inner and outer axes 16, 18, respectively. The elements are inner and outer helical blades 17, 27 having inner and outer helical surfaces 21, 23, respectively. The term worm is used because it is commonly used to describe worm or screw compressors and is descriptive of the helical elements wound about the inner and outer axes 16, 18. The inner helical blades 17 extend radially outwardly from a hollow inner hub 51 of the inner body 12 and the outer helical blades 27 extend radially inwardly from an outer shell 53 of the outer body 14. An inner helical edge 47 along the inner helical blade 17 sealingly engages the outer helical surface 23 of the outer helical blade 27 as they rotate relative to each other. An outer helical edge 48 along the outer helical blade 27 sealingly engages the inner helical surface 21 of the inner helical blade 17 as they rotate relative to each other.

Figure 3:
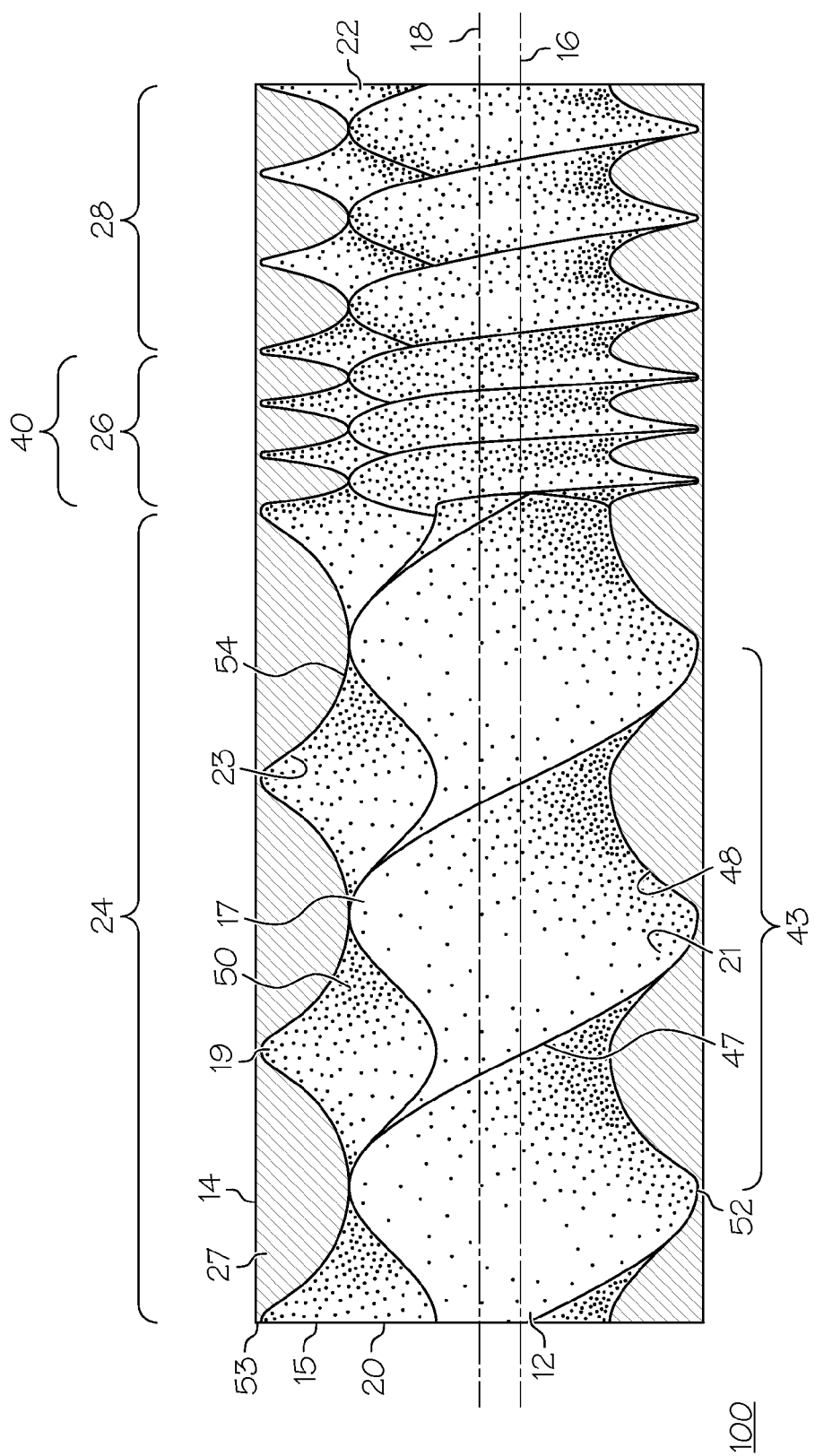
FIG. 3 is a diagrammatic partially cut away perspective view illustration of helical portions of inner and outer bodies of the gas generator illustrated in FIG. 2.
Figure 4:
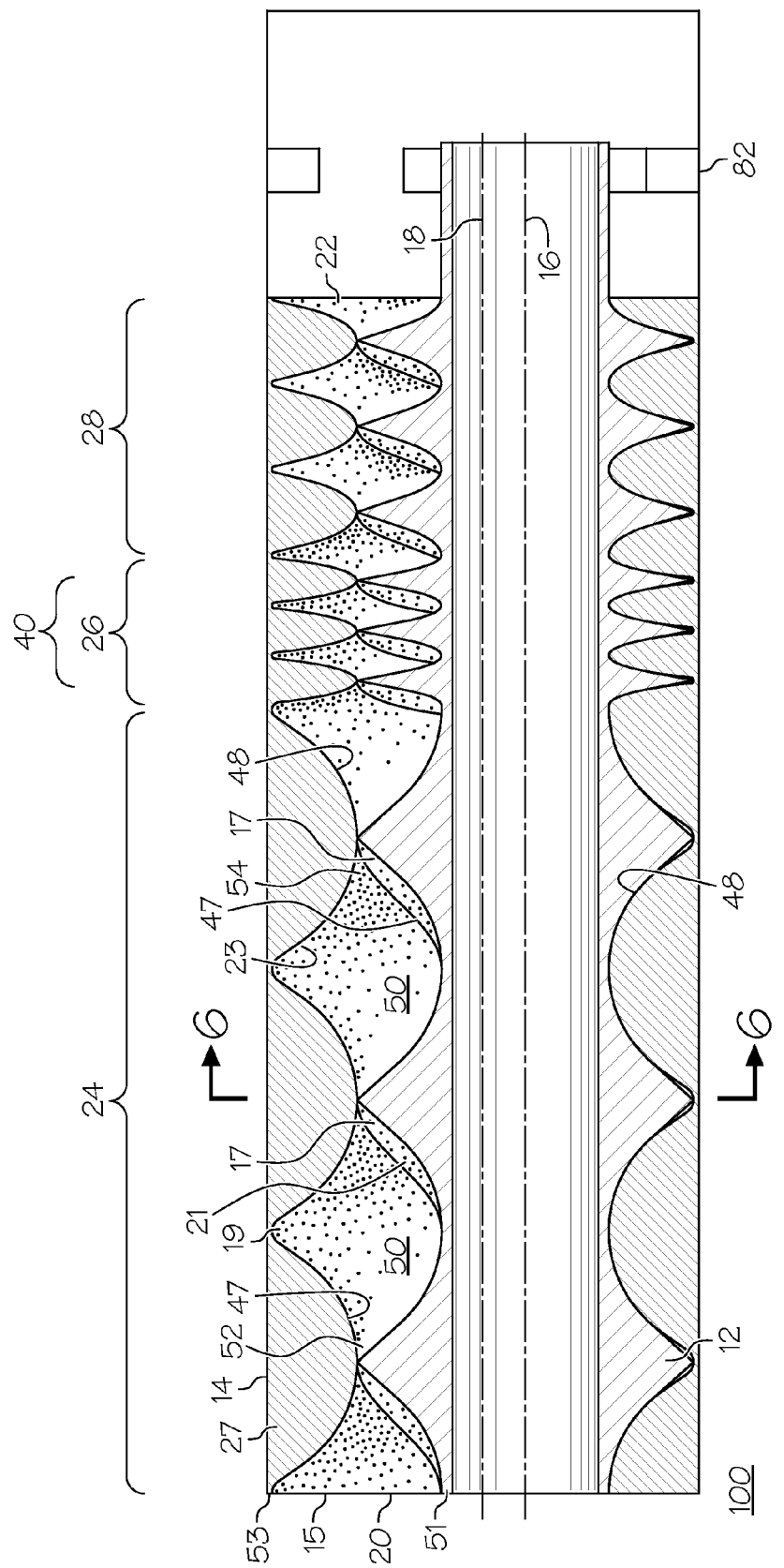
FIG. 4 is a diagrammatic cross-sectional view illustration of gearing between inner and outer bodies of the gas generator illustrated in FIG. 3.
Figure 8:
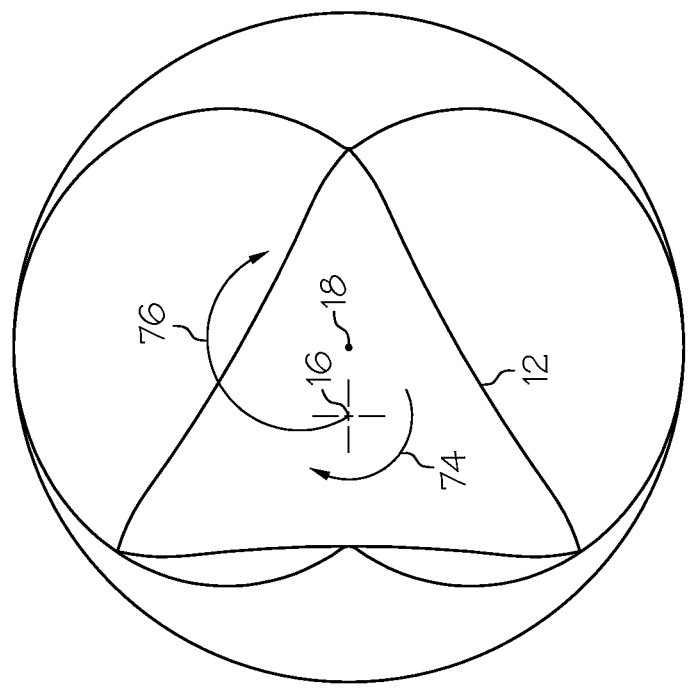
FIGS. 7-10 are diagrammatic cross-sectional view illustrations of an alternate inner and outer body configuration at different inner body relative angular positions.

Illustrated in FIG. 4 is a longitudinal cross-section taken through the inner and outer bodies 12, 14. The inner and outer bodies 12, 14 are illustrated in axial cross-section in FIG. 6. The inner body 12 is illustrated herein as having two inner body lobes 60 which correspond to two inner helical blades 17 and which results in a football or pointed oval-shaped inner body cross-section 69. The outer body 14 has three outer body lobes 64 which corresponds to three outer helical blades 27 (illustrated in FIGS. 3 and 4). Note that 3 sealing points 62 between the inner and outer bodies 12, 14 are illustrated in FIG. 6 but that there is continuous sealing between the inner and outer helical blades 17, 27 along the length of the inner and outer bodies 12, 14.

Figure 7:
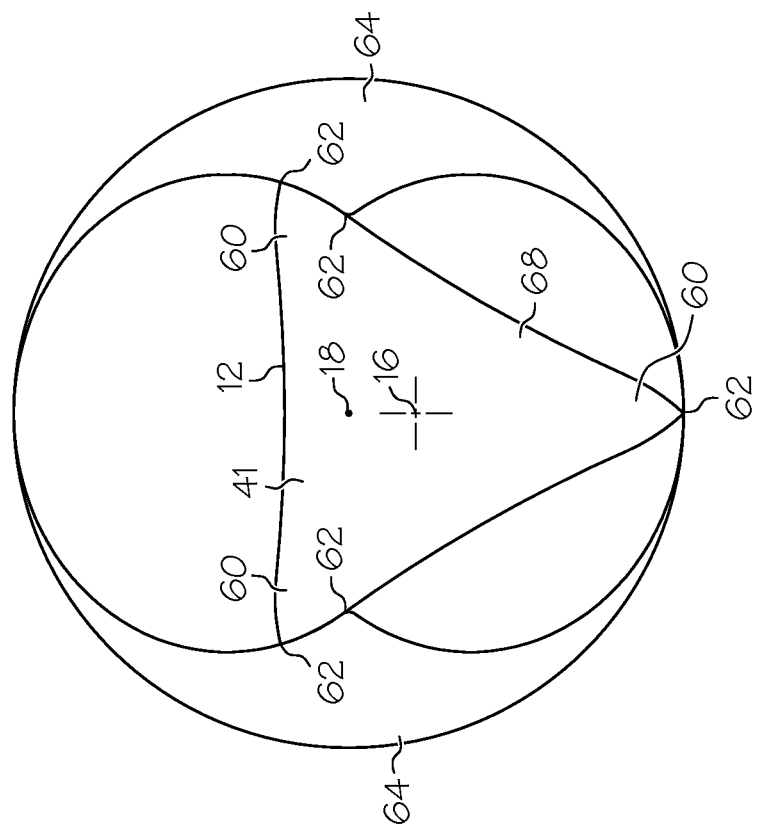
Figure 10:
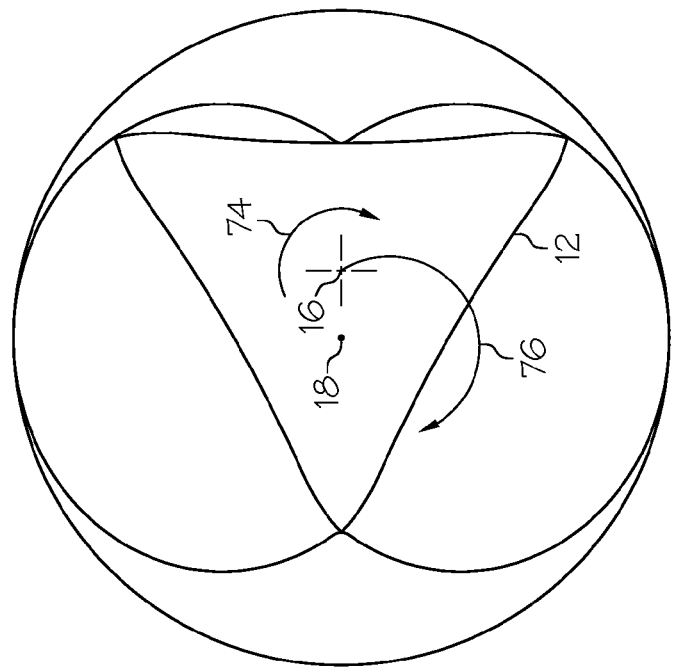
Figure 9:
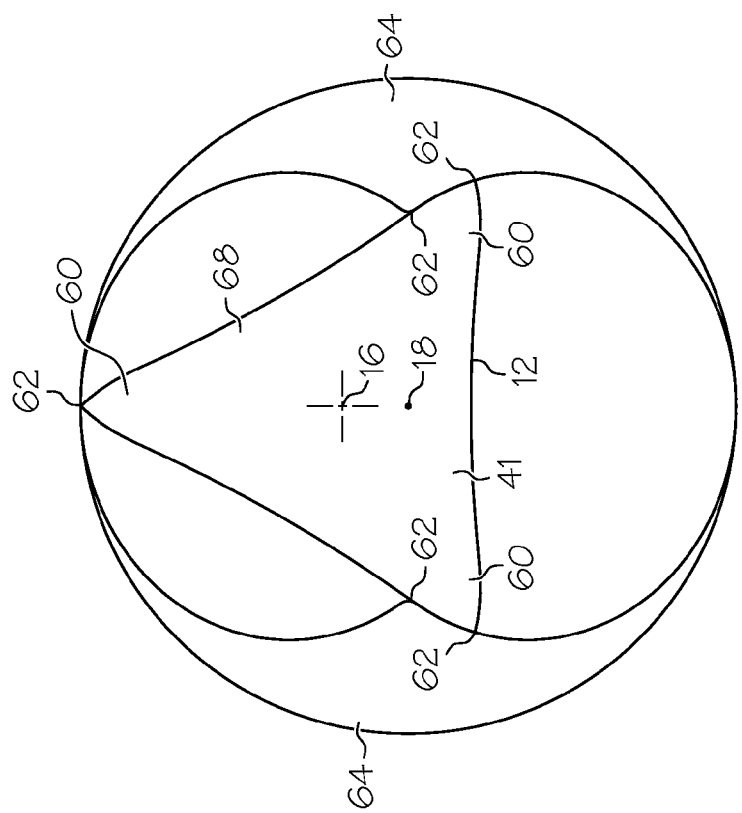

An alternative configuration of the inner and outer bodies 12, 14 is illustrated in cross-section in FIGS. 7-10. The inner body 12 is illustrated therein as having three inner body lobes 60 which correspond to three inner helical blades 17 which results in a triangularly-shaped inner body cross-section 68 as illustrated in FIG. 7. The outer body 14 has two outer body lobes 64 which corresponds to two outer helical blades 27. In general, if the inner body 12 has N number of lobes, the outer body 14 will have N+1 or N−1 lobes. Note that 5 sealing points 62 between the inner and outer bodies 12, 14 are illustrated in FIG. 7 but that there is continuous sealing between the inner and outer helical blades 17, 27 along the length of the inner and outer bodies 12, 14.

Referring to FIG. 5, the helical elements have constant first, second, and third twist slopes 34, 36, 38 in the first, second, and third sections 24, 26, 28, respectively. A twist slope A is defined as the amount of rotation of a cross-section 41 of the helical element (such as the oval-shaped or triangularly-shaped inner body cross-sections 69, 68 illustrated in FIGS. 6 and 7, respectively) per distance along an axis such as the inner axis 16 as illustrated in FIG. 5. Illustrated in FIG. 5 is 360 degrees of rotation of the inner body cross-section 41. The twist slope A is also 360 degrees or 2 Pi radians divided by an axial distance CD between two adjacent crests 44 along the same inner or outer helical edges 47, 48 of the helical element such as the inner or outer helical blades 17, 27 as illustrated in FIG. 5. The axial distance CD is the distance of one full turn 43 of the helix.

The twist slope A of the inner element in each of the sections is different from the twist slope A of the outer element. The ratio of the twist slope A of the outer body 14 to the twist slope A of the inner body 12 is equal to the ratio of the number of inner helical blades 17 on the inner body 12 to the number of outer helical blades 27 blades on the outer body 14. The first twist slopes 34 are less than the second twist slopes 36 and the third twist slopes 38 are less than the second twist slopes 36. One might also describe the helical elements in terms of helical angle. The helical elements have constant first, second, and third helical angles corresponding to the constant first, second, and third twist slopes 34, 36, 38 in the first, second, and third sections 24, 26, 28, respectively, in much the same way one would describe a screw in terms of pitch and pitch angle.

Referring again to FIGS. 3-5, the inner helical blade 17 in the first section 24 has a sufficient number of turns 43 to trap the charges of air 50 in the first section 24 during the generator's operation. The trapped charges of air 50 allow positive displacement compression so that higher pressures developed downstream cannot force air or the charges back out the inlet 20. In one embodiment of the gas generator, the number of turns 43 in the first section 24 is enough to mechanically trap the charges of air 50. In another embodiment of the gas generator 100, the number of turns 43 in the first section 24 is enough to dynamically trap the charges of air 50. Mechanically trapped means that the charge 50 is trapped by being closed off from the inlet 20 at an upstream end 52 of the charge 50 before it passes into the second section 26 at a downstream end 54 of the charge 50. Dynamically trapped means that though the downstream end 54 of the trapped charge may have passed into the second section 26, the upstream end 52 of the charge has not yet completely closed. However, at its downstream end 54, by the time a pressure wave from the second section travels to the inlet 20, relative rotation between the bodies will have closed off the trapped charge of air 50 at its upstream end 52.

For the fixed outer body 14 embodiment, the inner body 12 is cranked relative to the outer axis 18 so that as it rotates about the inner axis 16, the inner axis 16 orbits about the outer axis 18 as illustrated in FIGS. 7-10. The inner body 12 is illustrated as having been rotated about the inner axis 16 from its position in FIG. 7 to its position in FIG. 8, and the inner axis 16 is illustrated as having orbited about the outer axis 18 about 90 degrees. The inner and outer bodies 12, 14 are geared together so that they always rotate relative to each other at a fixed ratio as illustrated by gearing in coupling gearbox 82 in FIGS. 1 and 4.

If the outer body 14 in FIG. 7 was not fixed, then it would rotate about the outer axis 18 at 1.5 times the rotational speed that the inner body 12 rotates about the inner axis 16. The inner body 12 rotates about the inner axis 16 with an inner body rotational speed 74 equal to its orbital speed 76 divided by the number of inner body lobes. The number of inner lobes are equal to the number of blades. If the inner body 12 rotates in the same direction as its orbital direction, a 2 lobed outer body configuration is used. If the inner body 12 rotates in an opposite orbital direction, a 4 lobed outer body configuration is used.

Figure 2:
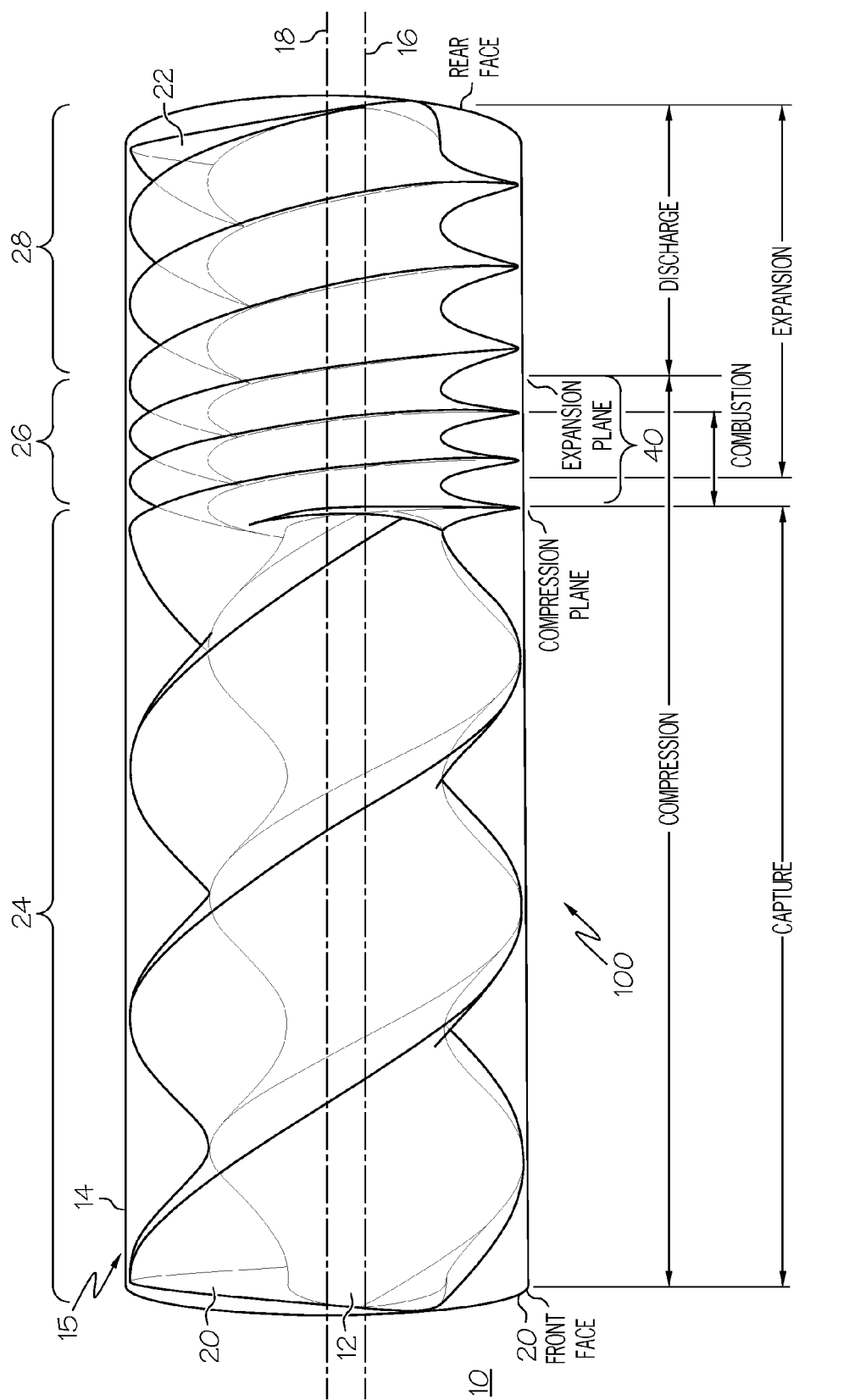
FIG. 2 is a diagrammatic cross-sectional view illustration of the gas generator illustrated in FIG. 1.
Figure 11:
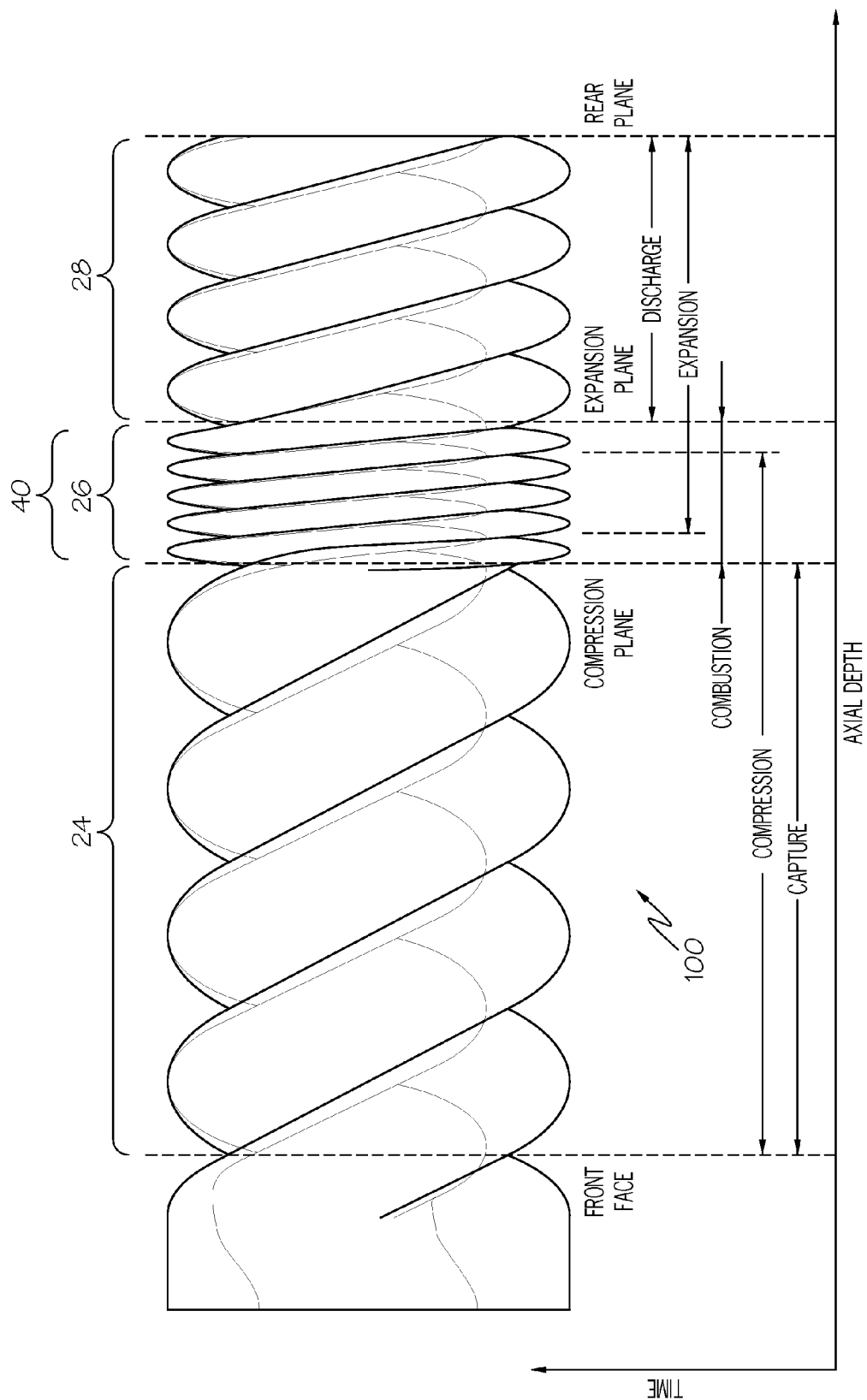
FIG. 11 is a diagrammatic cross-sectional view illustration of a positive displacement gas generator having the inner and outer bodies illustrated in FIG. 7.

The twist slopes of the outer body 14 are equal to the twist slopes of the inner body 12 times the number of inner body lobes N divided by the number of outer body lobes M. For the configuration illustrated in FIGS. 7-10 having three inner lobes or inner helical blades 17 and two outer lobes or outer helical blades 27, it takes 900 degrees of rotation of the outer body 14 and 600 degrees of rotation of the inner body 12 to mechanically capture one of the charges of air 50. The inner body twist slope is substantially increased going from the first section 24 to the second section 26. This axial location is designated the compression plane as indicated in FIG. 2. Constant volume combustion is initiated in the second section 26 when the entire charge of air 50 crosses the compression plane and has passed entirely into the second section 26. Each of the charges is combusted individually and, because the twist slopes in the inner and outer bodies remain constant through the second section 26, there is constant volume combustion in the second section 26. A further comparison to the embodiment of the inner and outer bodies 12, 14 having two inner body lobes 60 (two inner helical blades 17) may be had by comparing FIG. 11 to FIG. 2 particularly as regards the degrees of rotation of the outer body 14 and the degrees of rotation of the inner body 12 needed to capture one of the charges of air 50 and the difference in twist slopes of the first, second, and third sections 24, 26, and 28.

Referring to FIGS. 2-4, following the constant volume combustion in the second section 26, the charge or working fluid undergoes a nearly isentropic expansion process in the third section 28 and work is extracted from the third section 28. The expansion may be done at constant temperature. After the leading edge of the high temperature and high pressure charge crosses, the expansion plane, the volume of the charge of air 50 begins to expand and grow axially. This expansion extracts energy from the fluid, providing the work necessary to drive the first and second sections 24, 26 and sustain the gas generating process. Following expansion, the fluid is discharged across the rear plane into a downstream plenum at substantially elevated temperature and pressure relative to its initial state.

Figure 12:
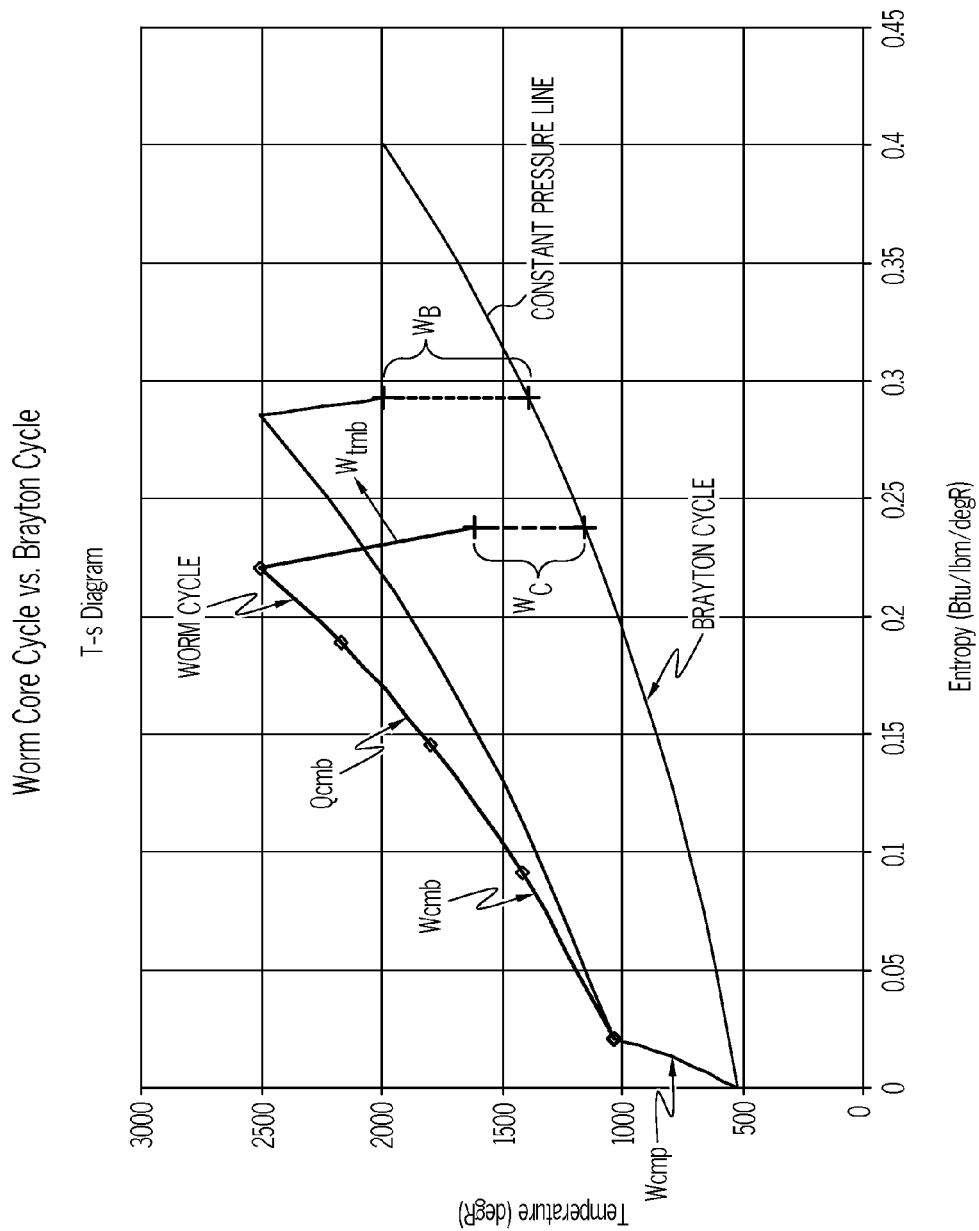
FIG. 12 is a diagrammatic view illustration of a T S temperature-entropy diagram illustrating a cycle of the gas generator illustrated in FIG. 2.

FIG. 12 illustrates a temperature-entropy diagram (T-S diagram) of a cycle of the worm engine denoted as a worm core cycle versus a Brayton cycle. The worm core cycle inputs work into the compression stage of the cycle, denoted as Wcmp, for compression. The worm core cycle inputs work, denoted as Wcmb, into the constant volume combustion stage of the cycle and inputs heat, denoted as Qcmb, for combustion. The worm core cycle extracts work adiabatically, denoted as Wtmb, during the expansion stage of the cycle. The worm core cycle could extract work isothermally. In the exemplary embodiment of the worm core cycle engine illustrated herein, the third section 28 functions as a turbine of the engine centerline 8 and inputs work into both the first and second sections 24, 26.

Net work of the worm core cycle engine as illustrated in FIG. 12 is WC and the net work of the Brayton cycle is as WB. The net work of the worm cycle illustrated herein and Brayton cycles are referenced to inlet pressure of the engine centerline 8 indicated by a constant pressure line in FIG. 12. The worm cycle illustrated herein also includes combustion through the entirety of the second section 26. This cycle for a positive displacement engine or gas generator offers substantial performance benefits over Brayton cycle engines in terms of both net work and thermal efficiency. The ability to increase net work over that of the Brayton cycle will allow the same power requirement to be met with a smaller engine or gas generator, making the combination particularly attractive for weight and size sensitive applications.

Figure 15:
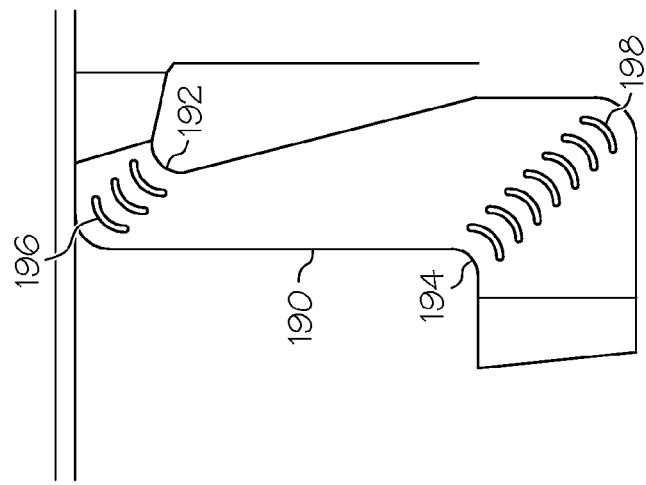
FIG. 15 is a cross-sectional view illustration of a short outlet transition duct from the worm gas generator to counter-rotatable low pressure turbines illustrated in FIG. 1.
Figure 14:
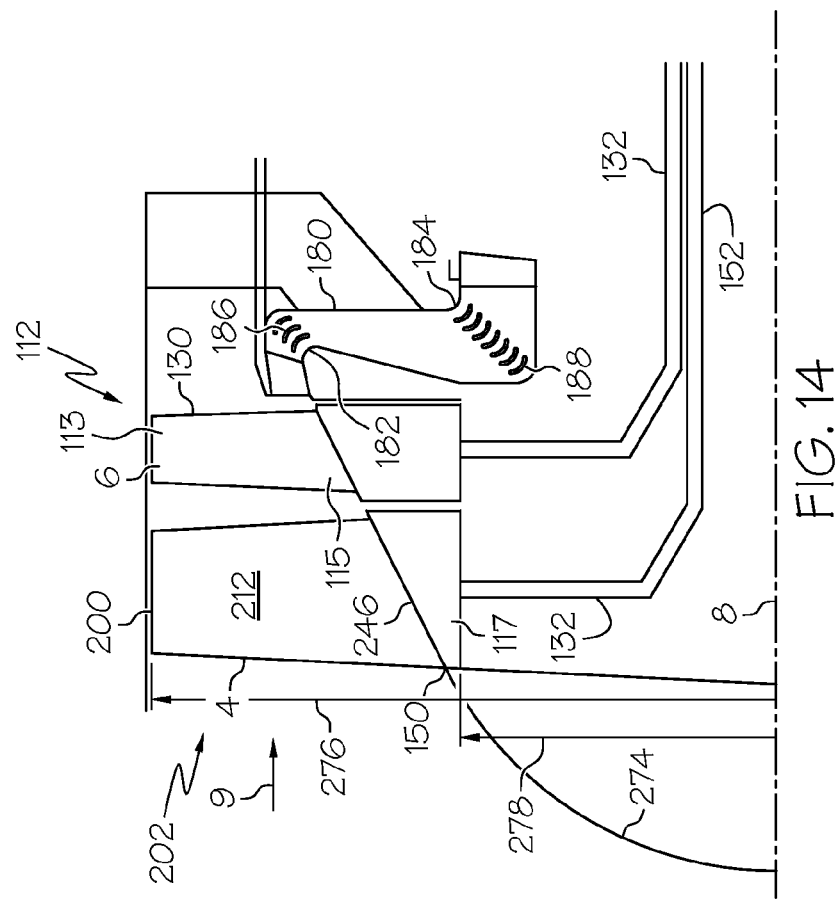
FIG. 14 is a cross-sectional view illustration of a short inlet transition duct between a fan section containing the counter-rotatable fans to the worm gas generator illustrated in FIG. 1.

Illustrated in FIGS. 1 and 13 and more particularly in FIG. 14 is a short inlet transition duct 180 between the fan section 112 and the core engine 118 or worm gas generator 100. The short inlet transition duct 180 has two approximately 90 degree outer and inner inlet bends 182, 184. Annular outer and inner inlet turning vanes 186, 188 disposed within the outer and inner inlet bends 182, 184, respectively, provide aerodynamically efficient flow through the bends. Illustrated in FIG. 15 is a short outlet transition duct 190 between the worm gas generator 100 and the counter-rotatable LPT 121. The outlet transition duct 190 has two approximately 90 degree radially spaced apart bends denoted as outer and inner outlet bends 192, 194. Radially spaced apart annular outer and inner outlet turning vanes 196, 198 disposed within the outer and inner outlet bends 192, 194 provide aerodynamically efficient flow through the bends.

The upstream fan blades 150 are more specifically illustrated in FIGS. 14 and 16-18. Each of the upstream fan blades 150 includes an airfoil 212 extending radially outwardly from the upstream fan disk 117 to a tip 200 of the airfoil 212. The airfoil 212 includes a generally convex suction and concave pressure sides 236, 238, respectively, extending axially between leading and trailing edges 232 and 234. The counter-rotatable upstream fan stage 4 is designed to have a low tip speed of about 850 ft/sec, a low inlet radius ratio that is in a range of about 0.10-0.15, and a high inlet design specific flow of about 44.5 lbs/sec. The low inlet radius ratio provides high flow per unit of frontal area.

Referring to FIG. 14, the fan inlet radius ratio is defined as an inlet hub radius 278 divided by an inlet fan blade tip radius 276. The inlet hub radius 278 and inlet fan blade tip radius 276 are measured with respect to the engine centerline 8. The inlet fan blade tip radius 276 is measured from the centerline 8 and fan blade tips 200 at a fan inlet 202 to the fan section 112. The inlet hub radius 278 is measured from the centerline 8 to an intersection of a hub 274 and fan blade platforms 246.

The fan stages are illustrated as having ten upstream fan blades 150. The downstream fan stage 6 is designed to have a tip speed consistent with its pressure ratio requirement as is appropriate for low noise and a conventional 0.3 class inlet radius ratio. The axial flow positive displacement gas generator 100 is a constant displacement high pressure spool with near constant pressure ratio independent of speed or inlet flow.

Figure 19:
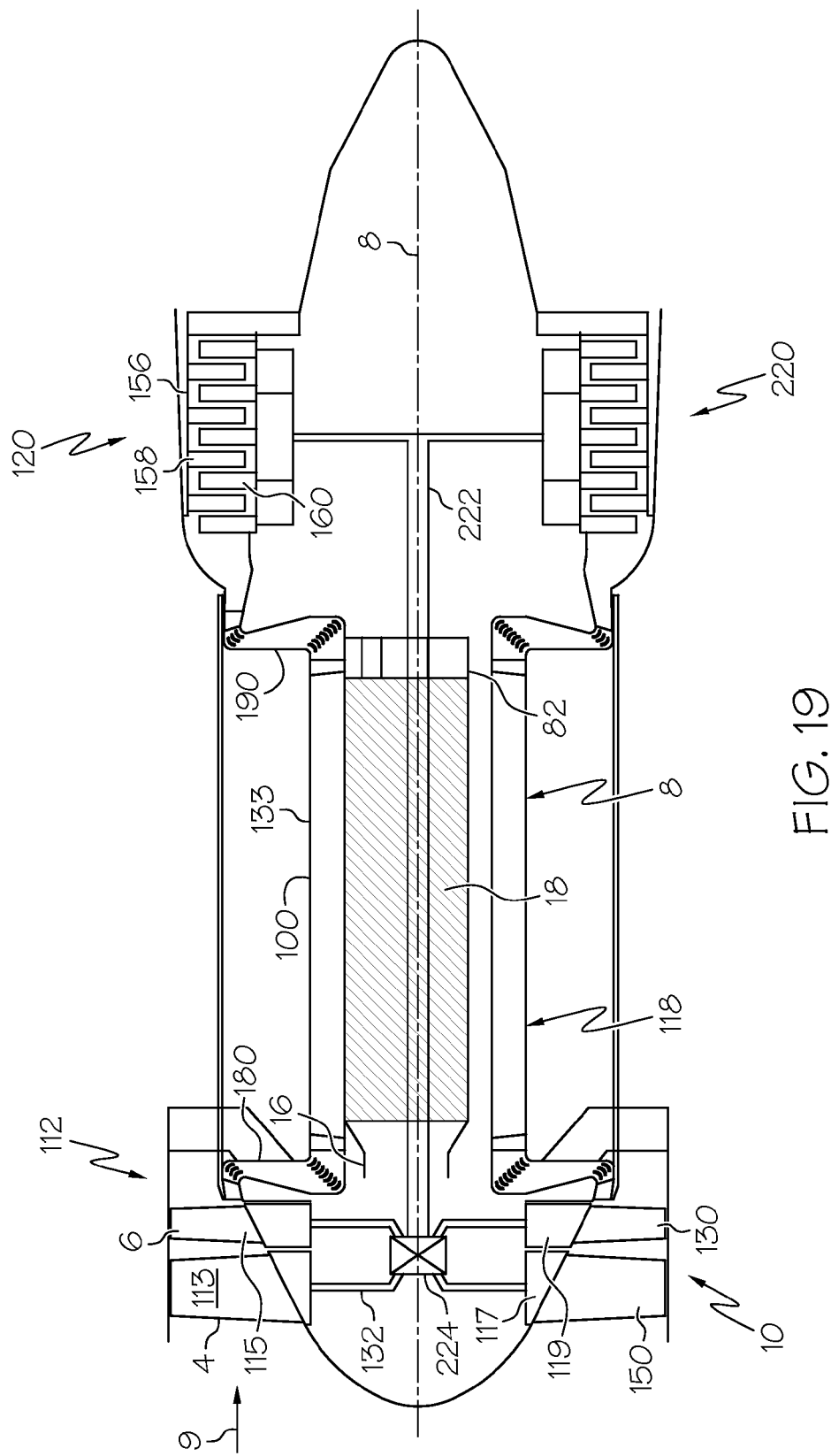
FIG. 19 is a cross-sectional view illustration of an alternative exemplary aircraft gas turbine engine with counter-rotatable fan section and a positive displacement axial flow or worm gas generator and a single direction of rotation turbine drivingly connected to the counter-rotatable fan section.

Illustrated in FIG. 19 is another embodiment of the engine 10 with the low pressure turbine 120 having a single direction of rotation turbine 220 drivingly connected to the counter-rotatable fan section 112 by a single low pressure shaft 222. The low pressure shaft 222 is drivingly connected to the upstream and downstream fan blade rows 113, 115 through a drive gearbox 224 such as a planetary gearbox.

While there have been described herein what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention. Accordingly, what is desired to be secured by Letters Patent of the United States is the invention as defined and differentiated in the following claims.

What is claimed is:

1. A counter-rotatable fan gas turbine engine comprising:
   in downstream serial flow relationship a counter-rotatable fan section, a worm gas generator, and a counter-rotatable low pressure turbine operably connected to the counter-rotatable fan section;
   an inlet transition duct between the counter-rotatable fan section and the worm gas generator; and
   radially spaced apart approximately 90 degree outer and inner inlet bends in the inlet transition duct.

2. The engine as claimed in claim 1 further comprising:
the gas generator including an inlet axially spaced apart and upstream from an outlet,
a core assembly including an inner body disposed within an outer body and the inner and outer bodies extending from the inlet to the outlet,
the inner and outer bodies having offset inner and outer axes respectively,
at least one of the inner and outer bodies being rotatable about a corresponding one of the inner and outer axes,
the inner and outer bodies having intermeshed inner and outer helical blades wound about the inner and outer axes respectively,
the inner and outer helical blades extending radially outwardly and inwardly respectively,
the core assembly having first, second, and third sections in serial downstream flow relationship extending between the inlet and the outlet,
the inner and outer helical blades having first, second, and third twist slopes in the first, second, and third sections respectively,
the first twist slopes being less than the second twist slopes and the third twist slopes being less than the second twist slopes, and
a combustor section extending axially downstream through at least a portion of the second section.

3. The engine as claimed in claim 2 further comprising the outer body being rotatable about the outer axis and the inner body and being rotatable about the inner axis.

4. The engine as claimed in claim 3 further comprising the inner and outer bodies being geared together in a fixed gear ratio.

5. The engine as claimed in claim 2 further comprising the outer body being rotatably fixed about the outer axis and the inner body being orbital about the outer axis.

6. The engine as claimed in claim 5 further comprising the inner and outer bodies being geared together in a fixed gear ratio.

7. The engine as claimed in claim 1 further comprising the counter-rotatable low pressure turbine including upstream and downstream low pressure turbines.

8. The engine as claimed in claim 7 further comprising:
the gas generator including an inlet axially spaced apart and upstream from an outlet,
a core assembly including an inner body disposed within an outer body and the inner and outer bodies extending from the inlet to the outlet,
the inner and outer bodies having offset inner and outer axes respectively,
at least one of the inner and outer bodies being rotatable about a corresponding one of the inner and outer axes,
the inner and outer bodies having intermeshed inner and outer helical blades wound about the inner and outer axes respectively,
the inner and outer helical blades extending radially outwardly and inwardly respectively,
the core assembly having first, second, and third sections in serial downstream flow relationship extending between the inlet and the outlet,
the inner and outer helical blades having first, second, and third twist slopes in the first, second, and third sections respectively,
the first twist slopes being less than the second twist slopes and the third twist slopes being less than the second twist slopes, and
a combustor section extending axially downstream through at least a portion of the second section.

9. The engine as claimed in claim 8 further comprising the outer body being rotatable about the outer axis and the inner body and being rotatable about the inner axis.

10. The engine as claimed in claim 9 further comprising the inner and outer bodies being geared together in a fixed gear ratio.

11. The engine as claimed in claim 8 further comprising the outer body being rotatably fixed about the outer axis and the inner body being orbital about the outer axis.

12. The engine as claimed in claim 11 further comprising the inner and outer bodies being geared together in a fixed gear ratio.

13. The engine as claimed in claim 7 further comprising upstream and downstream low pressure turbines in the counter-rotatable low pressure turbine drivingly connected to counter-rotatable upstream and downstream fan stages in the counter-rotatable fan section.

14. The engine as claimed in claim 13 further comprising the downstream low pressure turbine drivingly connected to the upstream fan stage by a low pressure inner shaft and the upstream low pressure turbine drivingly connected to the downstream fan stage by a low pressure outer shaft.

15. The engine as claimed in claim 14 further comprising:
the gas generator including an inlet axially spaced apart and upstream from an outlet,
a core assembly including an inner body disposed within an outer body and the inner and outer bodies extending from the inlet to the outlet,
the inner and outer bodies having offset inner and outer axes respectively,
at least one of the inner and outer bodies being rotatable about a corresponding one of the inner and outer axes,
the inner and outer bodies having intermeshed inner and outer helical blades wound about the inner and outer axes respectively,
the inner and outer helical blades extending radially outwardly and inwardly respectively,
the core assembly having first, second, and third sections in serial downstream flow relationship extending between the inlet and the outlet,
the inner and outer helical blades having first, second, and third twist slopes in the first, second, and third sections respectively,
the first twist slopes being less than the second twist slopes and the third twist slopes being less than the second twist slopes, and
a combustor section extending axially downstream through at least a portion of the second section.

16. The engine as claimed in claim 15 further comprising the outer body being rotatable about the outer axis and the inner body and being rotatable about the inner axis.

17. The engine as claimed in claim 16 further comprising the inner and outer bodies being geared together in a fixed gear ratio.

18. The engine as claimed in claim 15 further comprising the outer body being rotatably fixed about the outer axis and the inner body being orbital about the outer axis.

19. The engine as claimed in claim 18 further comprising the inner and outer bodies being geared together in a fixed gear ratio.

20. The engine as claimed in claim 7 further comprising:
annular low pressure inner and outer drums in the counter-rotatable low pressure turbine drivingly connected to counter-rotatable upstream and downstream fan stages in the counter-rotatable fan section, a plurality of axially spaced apart rows of circumferentially spaced apart and radially outwardly extending turbine blades of the inner drum, a plurality of axially spaced apart rows of circumferentially spaced apart and radially inwardly extending turbine blades of the outer drum, and the radially inwardly extending turbine blades being interdigitated with the radially outwardly extending turbine blades.

21. The engine as claimed in claim 20 further comprising the annular low pressure inner drum drivingly connected to the downstream fan stage by a low pressure outer shaft and the outer drum drivingly connected to the upstream fan stage by a low pressure inner shaft.

22. The engine as claimed in claim 20 further comprising:
the gas generator including an inlet axially spaced apart and upstream from an outlet,
a core assembly including an inner body disposed within an outer body and the inner and outer bodies extending from the inlet to the outlet,
the inner and outer bodies having offset inner and outer axes respectively,
at least one of the inner and outer bodies being rotatable about a corresponding one of the inner and outer axes,
the inner and outer bodies having intermeshed inner and outer helical blades wound about the inner and outer axes respectively,
the inner and outer helical blades extending radially outwardly and inwardly respectively,
the core assembly having first, second, and third sections in serial downstream flow relationship extending between the inlet and the outlet,
the inner and outer helical blades having first, second, and third twist slopes in the first, second, and third sections respectively,
the first twist slopes being less than the second twist slopes and the third twist slopes being less than the second twist slopes, and
a combustor section extending axially downstream through at least a portion of the second section.

23. The engine as claimed in claim 22 further comprising the outer body being rotatable about the outer axis and the inner body and being rotatable about the inner axis.

24. The engine as claimed in claim 23 further comprising the inner and outer bodies being geared together in a fixed gear ratio.

25. The engine as claimed in claim 22 further comprising the outer body being rotatably fixed about the outer axis and the inner body being orbital about the outer axis.

26. The engine as claimed in claim 25 further comprising the inner and outer bodies being geared together in a fixed gear ratio.

27. The engine as claimed in claim 1 further comprising counter-rotatable upstream and downstream fan stages having upstream and downstream low inlet radius ratios respectively in a range of about 0.10-0.15.

28. The engine as claimed in claim 27 further comprising:
the gas generator including an inlet axially spaced apart and upstream from an outlet,
a core assembly including an inner body disposed within an outer body and the inner and outer bodies extending from the inlet to the outlet,
the inner and outer bodies having offset inner and outer axes respectively,
at least one of the inner and outer bodies being rotatable about a corresponding one of the inner and outer axes,
the inner and outer bodies having intermeshed inner and outer helical blades wound about the inner and outer axes respectively,
the inner and outer helical blades extending radially outwardly and inwardly respectively,
the core assembly having first, second, and third sections in serial downstream flow relationship extending between the inlet and the outlet,
the inner and outer helical blades having first, second, and third twist slopes in the first, second, and third sections respectively,
the first twist slopes being less than the second twist slopes and the third twist slopes being less than the second twist slopes, and
a combustor section extending axially downstream through at least a portion of the second section.

29. The engine as claimed in claim 28 further comprising the outer body being rotatable about the outer axis and the inner body and being rotatable about the inner axis.

30. The engine as claimed in claim 29 further comprising the inner and outer bodies being geared together in a fixed gear ratio.

31. The engine as claimed in claim 28 further comprising the outer body being rotatably fixed about the outer axis and the inner body being orbital about the outer axis.

32. The engine as claimed in claim 31 further comprising the inner and outer bodies being geared together in a fixed gear ratio.

33. A counter-rotatable fan gas turbine engine comprising:
in downstream serial flow relationship a counter-rotatable fan section, a worm gas generator, and a counter-rotatable low pressure turbine operably connected to the counter-rotatable fan section,
an inlet transition duct between the counter-rotatable fan section and the worm gas generator, radially spaced apart outer and inner inlet bends in the inlet transition duct, and
radially spaced apart annular outer and inner inlet turning vanes disposed within the outer and inner inlet bends respectively.

34. The engine as claimed in claim 33 further comprising:
an outlet transition duct between the worm gas generator and the counter-rotatable low pressure turbine,
radially spaced apart outer and inner outlet bends in the outlet transition duct, and
radially spaced apart annular outer and inner outlet turning vanes disposed within the outer and inner outlet bends respectively.

35. The engine as claimed in claim 34 further comprising:
the gas generator including an inlet axially spaced apart and upstream from an outlet,
a core assembly including an inner body disposed within an outer body and the inner and outer bodies extending from the inlet to the outlet,
the inner and outer bodies having offset inner and outer axes respectively,
at least one of the inner and outer bodies being rotatable about a corresponding one of the inner and outer axes,
the inner and outer bodies having intermeshed inner and outer helical blades wound about the inner and outer axes respectively,
the inner and outer helical blades extending radially outwardly and inwardly respectively,
the core assembly having first, second, and third sections in serial downstream flow relationship extending between the inlet and the outlet, the inner and outer helical blades having first, second, and third twist slopes in the first, second, and third sections respectively, the first twist slopes being less than the second twist slopes and the third twist slopes being less than the second twist slopes, and a combustor section extending axially downstream through at least a portion of the second section.

36. The engine as claimed in claim 35 further comprising the outer body being rotatable about the outer axis and the inner body and being rotatable about the inner axis.

37. The engine as claimed in claim 36 further comprising the inner and outer bodies being geared together in a fixed gear ratio.

38. The engine as claimed in claim 35 further comprising the outer body being rotatably fixed about the outer axis and the inner body being orbital about the outer axis.

39. The engine as claimed in claim 38 further comprising the inner and outer bodies being geared together in a fixed gear ratio.

40. A counter-rotatable fan gas turbine engine comprising:
in downstream serial flow relationship a counter-rotatable fan section, a worm gas generator, and a counter-rotatable low pressure turbine operably connected to the counter-rotatable fan section,
counter-rotatable upstream and downstream fan stages having upstream and downstream low inlet radius ratios respectively in a range of about 0.10-0.15,
an inlet transition duct between the counter-rotatable fan section and the worm gas generator,
radially spaced apart outer and inner inlet bends in the inlet transition duct,
radially spaced apart annular outer and inner inlet turning vanes disposed within the outer and inner inlet bends respectively,
an outlet transition duct between the worm gas generator and the counter-rotatable low pressure turbine,
radially spaced apart outer and inner outlet bends in the outlet transition duct, and
radially spaced apart annular outer and inner outlet turning vanes disposed within the outer and inner outlet bends respectively.

41. The engine as claimed in claim 40 further comprising:
the gas generator including an inlet axially spaced apart and upstream from an outlet,
a core assembly including an inner body disposed within an outer body and the inner and outer bodies extending from the inlet to the outlet,
the inner and outer bodies having offset inner and outer axes respectively,
at least one of the inner and outer bodies being rotatable about a corresponding one of the inner and outer axes,
the inner and outer bodies having intermeshed inner and outer helical blades wound about the inner and outer axes respectively,
the inner and outer helical blades extending radially outwardly and inwardly respectively,
the core assembly having first, second, and third sections in serial downstream flow relationship extending between the inlet and the outlet,
the inner and outer helical blades having first, second, and third twist slopes in the first, second, and third sections respectively,
the first twist slopes being less than the second twist slopes and the third twist slopes being less than the second twist slopes, and
a combustor section extending axially downstream through at least a portion of the second section.

42. The engine as claimed in claim 41 further comprising the outer body being rotatable about the outer axis and the inner body and being rotatable about the inner axis.

43. The engine as claimed in claim 42 further comprising the inner and outer bodies being geared together in a fixed gear ratio.

44. The engine as claimed in claim 41 further comprising the outer body being rotatably fixed about the outer axis and the inner body being orbital about the outer axis.

45. The engine as claimed in claim 44 further comprising the inner and outer bodies being geared together in a fixed gear ratio.

46. A counter-rotatable fan gas turbine engine comprising:
in downstream serial flow relationship a counter-rotatable fan section, a worm gas generator, and a low pressure turbine operably connected to the counter-rotatable fan section;
an inlet transition duct between the counter-rotatable fan section and the worm gas generator; and
radially spaced apart approximately 90 degree outer and inner inlet bends in the inlet transition duct.

47. The engine as claimed in claim 46 further comprising the low pressure turbine being a single direction of rotation turbine drivingly connected to the counter-rotatable fan section by a single low pressure shaft through a drive gearbox.

48. The engine as claimed in claim 47 further comprising:
the gas generator including an inlet axially spaced apart and upstream from an outlet,
a core assembly including an inner body disposed within an outer body and the inner and outer bodies extending from the inlet to the outlet,
the inner and outer bodies having offset inner and outer axes respectively,
at least one of the inner and outer bodies being rotatable about a corresponding one of the inner and outer axes,
the inner and outer bodies having intermeshed inner and outer helical blades wound about the inner and outer axes respectively,
the inner and outer helical blades extending radially outwardly and inwardly respectively,
the core assembly having first, second, and third sections in serial downstream flow relationship extending between the inlet and the outlet,
the inner and outer helical blades having first, second, and third twist slopes in the first, second, and third sections respectively,
the first twist slopes being less than the second twist slopes and the third twist slopes being less than the second twist slopes, and
a combustor section extending axially downstream through at least a portion of the second section.

49. The engine as claimed in claim 48 further comprising the outer body being rotatable about the outer axis and the inner body and being rotatable about the inner axis.

50. The engine as claimed in claim 49 further comprising the inner and outer bodies being geared together in a fixed gear ratio.

51. The engine as claimed in claim 48 further comprising the outer body being rotatably fixed about the outer axis and the inner body being orbital about the outer axis.

52. The engine as claimed in claim 51 further comprising the inner and outer bodies being geared together in a fixed gear ratio.

53. A counter-rotatable fan gas turbine engine comprising:
in downstream serial flow relationship a counter-rotatable fan section, a worm gas generator, and a low pressure turbine operably connected to the counter-rotatable fan section,
an inlet transition duct between the counter-rotatable fan section and the worm gas generator,
radially spaced apart outer and inner inlet bends in the inlet transition duct, and
radially spaced apart annular outer and inner inlet turning vanes disposed within the outer and inner inlet bends respectively.

54. The engine as claimed in claim 53 further comprising:
an outlet transition duct between the worm gas generator and the low pressure turbine,
radially spaced apart outer and inner outlet bends in the outlet transition duct, and
radially spaced apart annular outer and inner outlet turning vanes disposed within the outer and inner outlet bends respectively.

55. A counter-rotatable fan gas turbine engine comprising:
in downstream serial flow relationship a counter-rotatable fan section having counter-rotatable upstream and downstream fan stages, a worm gas generator, and a low pressure turbine operably connected to the counter-rotatable fan section;
an inlet transition duct between the counter-rotatable fan section and the worm gas generator;
radially spaced apart approximately 90 degree outer and inner inlet bends in the inlet transition duct;
the counter-rotatable upstream fan stage having a low inlet radius ratio in a range of about 0.10-0.15;
the fan inlet radius ratio being defined as an inlet hub radius divided by an inlet fan blade tip radius; and
the inlet hub radius and inlet fan blade tip radius being measured with respect to an engine centerline of the engine.

56. The engine as claimed in claim 55 further comprising the low pressure turbine being a single direction of rotation turbine drivingly connected to the counter-rotatable fan section by a single low pressure shaft through a drive gearbox.

57. The engine as claimed in claim 55 further comprising the low pressure turbine being a counter-rotatable low pressure turbine.

58. The engine as claimed in claim 57 further comprising upstream and downstream low pressure turbines in the counter-rotatable low pressure turbine drivingly connected to the counter-rotatable upstream and downstream fan stages in the counter-rotatable fan section.

59. The engine as claimed in claim 57 further comprising:
annular low pressure inner and outer drums in the counter-rotatable low pressure turbine drivingly connected to counter-rotatable upstream and downstream fan stages in the counter-rotatable fan section,
a plurality of axially spaced apart rows of circumferentially spaced apart and radially outwardly extending turbine blades of the inner drum,
a plurality of axially spaced apart rows of circumferentially spaced apart and radially inwardly extending turbine blades of the outer drum, and
the radially inwardly extending turbine blades being interdigitated with the radially outwardly extending turbine blades.

60. The engine as claimed in claim 59 further comprising the annular low pressure inner drum drivingly connected to the downstream fan stage by a low pressure outer shaft and the outer drum drivingly connected to the upstream fan stage by a low pressure inner shaft.

* * * * *